United States Patent
Pennapareddy

(10) Patent No.: US 11,682,310 B2
(45) Date of Patent: Jun. 20, 2023

(54) SYSTEM AND METHOD FOR VERIFYING AIRCRAFT POSITION INFORMATION

(71) Applicant: THE BOEING COMPANY, Chicago, IL (US)

(72) Inventor: Swathi Pennapareddy, Bangalore (IN)

(73) Assignee: THE BOEING COMPANY, Arlington, VA (US)

( * ) Notice: Subject to any disclaimer, the term of this patent is extended or adjusted under 35 U.S.C. 154(b) by 217 days.

(21) Appl. No.: 16/528,170

(22) Filed: Jul. 31, 2019

(65) Prior Publication Data

US 2021/0035457 A1     Feb. 4, 2021

(51) Int. Cl.
| | |
|---|---|
| G08G 5/00 | (2006.01) |
| H04L 9/06 | (2006.01) |
| H04L 9/00 | (2022.01) |
| G01S 5/00 | (2006.01) |
| G01S 19/14 | (2010.01) |
| H04L 9/32 | (2006.01) |
| H04L 9/40 | (2022.01) |
| H04W 4/02 | (2018.01) |
| H04W 4/06 | (2009.01) |

(Continued)

(52) U.S. Cl.
CPC .......... *G08G 5/0078* (2013.01); *G08G 5/003* (2013.01); *G08G 5/0008* (2013.01); *G08G 5/0021* (2013.01); *H04L 9/0643* (2013.01); *H04L 9/50* (2022.05)

(58) Field of Classification Search
CPC .. G08G 5/0078; G08G 5/0008; G08G 5/0021; G08G 5/003; H04L 9/0643; H04L 2209/38
See application file for complete search history.

(56) References Cited

U.S. PATENT DOCUMENTS 6,469,660 B1    10/2002    Horvath et al.
9,613,536 B1 *    4/2017    Wolford ............... G08G 5/0026

(Continued)

OTHER PUBLICATIONS

Blockchain technology for airlines, Accenture, https://www.accenture.com/ae-en/insights/travel/blockchain-technology-airlines, retrieved Dec. 1, 2020, 11 pgs.

(Continued)

*Primary Examiner* — Aniss Chad
*Assistant Examiner* — Madison R Hughes
(74) *Attorney, Agent, or Firm* — Moore IP Law

(57) ABSTRACT

A method of verifying aircraft position information based on ADS-B messages includes receiving an ADS-B message indicating an identifier of an aircraft and indicating a position of the aircraft. The method includes accessing a tamper-resistant distributed public ledger of authenticated flight plan data to determine whether flight plan data associated with the identifier is stored in the tamper-resistant distributed public ledger. The method includes, conditioned upon a determination that the flight plan data is stored in the tamper-resistant distributed public ledger, comparing the position to a flight path indicated by the flight plan data. The method includes selecting a characteristic of an icon corresponding to the aircraft based on a determination whether the position corresponds to the flight path. The method further includes displaying, on a display device and based on the characteristic, the icon at a location corresponding to the position.

20 Claims, 6 Drawing Sheets

(51) Int. Cl.
  *H04W 4/42* (2018.01)
  *G06F 16/27* (2019.01)
  *G06F 21/64* (2013.01)
  *H04L 67/12* (2022.01)

(56) References Cited

U.S. PATENT DOCUMENTS

| | | |
|---|---|---|
| 10,726,729 B1 | 7/2020 | Eaves et al. |
| 2006/0119515 A1 | 6/2006 | Smith |
| 2011/0057830 A1 | 3/2011 | Sampigethaya et al. |
| 2011/0140950 A1 | 6/2011 | Andersson |
| 2012/0041620 A1 | 2/2012 | Stayton et al. |
| 2013/0009823 A1* | 1/2013 | Wang ............... G01S 13/91 342/464 |
| 2017/0236425 A1 | 8/2017 | Ballestros et al. |
| 2017/0278410 A1 | 9/2017 | Byers et al. |
| 2019/0042748 A1 | 2/2019 | Shabtai et al. |
| 2019/0280871 A1* | 9/2019 | Subramanian ....... G06Q 20/325 |
| 2020/0372808 A1* | 11/2020 | Carraway ............. H04L 9/3297 |

OTHER PUBLICATIONS

"Blockchain: the future of flight data management?" https://www.airport-technology.com/features/blockchain-future-flight-data-management/, Mar. 27, 2018, '3 pgs.
ADS-B Implementation and Operations Guidance Document, Edition 11.0, International Civil Aviation Organization Asia and Pacific Office, Jul. 2018, pp. 1-126.
Automatic Dependent Surveillance Broadcast (ADS-B), http://www.skybrary.aero/index.php/Automatic_Dependent_Surveillance_Broadcast_(ADS-B), retrieved Aug. 12, 2019, 9 pgs.
Costin, A. et al., "Ghost in the Air (Traffic): On insecurity of ADS-B protocol and practical attacks on ADS-B devices", Network and Security Department, EURECOM, 9 pgs.
Extended European Search Report for Application No. 20178004.6 dated Nov. 19, 2020, 11 pgs.
Haines, Brad, "Hackers + Airplanes No Good Can Come of This," in Def Con 20, 2012, 47 pgs.
Navaid, "Surveillance in ATM an overview," http://www.navaid.dk/side6.html, retrieved Aug. 12, 2019, 4 pgs.
Poovendran, Radha, "Assessment and mitigation of cyber exploits in future aircraft surveillance," IEEE Aerospace Conference Proceedings, Mar. 2020, 11 pgs.
Thurber, Matt, "Hackers, FAA Disagree Over ADS-B Vulnerability," Air Transport, Aviation International News Online, Aug. 21, 2012, 1 pg.
Wikipedia, "Automatic dependent surveillance—broadcast", https://en.wikipedia.org/wiki/Automatic_dependent_surveillance_%E2%80%93_broadcast, retrieved Aug. 12, 2019, 17 pgs.
Beyond the Buzz: The potential of blockchain technology for airlines, <https://www.accenture.com/ae-en/insight-potential-blockchain-technology-for-airlines> retrieved Jul. 31, 2019, 2 pgs.
Generating more transparency in aviation with blockchain technology, <https://www.lufthansa-industry-solutions.com/de-en/solutions-products/aviation/generating-more-transparency-in-aviation-with-blockchain-technology/> retrieved Jul. 31, 2019, 1 pg.
Blockchain Use Cases for Aviation Industry, Nov. 21, 2017, <https://www.blockchain-council.org/blockchain/blockchain-use-cases-for-aviation-industry/>, 3 pgs.
"Multilateration Executive Reference Guide," <www.multilateration.com>, retrieved on Dec. 20, 2018, pp. 1-48.
"Security Issues of ADS-B Operations," International Civil Aviation Organization, Automatic Dependent Surveillance Broadcast Seminar and Thirteenth Meeting of Automatic Dependent Surveillance—Broadcast (ADS-B) Study and Implementation Task Force (ADS_B SIFT/13), Apr. 2014, 3 pgs.
Sampigethaya, Krishna, et al., "A Framework for Securing Future e-Enabled Aircraft Navigation and Surveillance," American Institute of Aeronautics and Astronautics, Apr. 2009, pp. 1-10.

\* cited by examiner

SYSTEM AND METHOD FOR VERIFYING AIRCRAFT POSITION INFORMATION

FIELD OF THE DISCLOSURE

The present disclosure is generally related to verifying aircraft position information.

BACKGROUND

Automatic Dependent Surveillance-Broadcast (ADS-B) is a technology that enables an aircraft to measure its own position by use of electronic equipment on-board the aircraft and to transmit position information using a digital data link. For example, the aircraft can use a global positioning system (GPS) receiver to determine the position information, and then the aircraft can transmit the position information in an ADS-B message to other aircraft, to air traffic control towers or other ground stations, or to other recipients. The Federal Aviation Administration (FAA) has mandated that aircraft be equipped to transmit ADS-B messages by 2020. Thus, aircraft manufacturers are increasingly including ADS-B capability on aircrafts. To maintain transparency to recipients, the ADS-B messages are unencrypted. Because the ADS-B messages are unencrypted, there is concern that a malicious actor could generate inaccurate or inauthentic ADS-B messages.

SUMMARY

In a particular implementation, a method of verifying aircraft position information based on automatic dependent surveillance broadcast (ADS-B) messages includes receiving an ADS-B message indicating an identifier of an aircraft and indicating a position of the aircraft. The method includes accessing a tamper-resistant distributed public ledger of authenticated flight plan data to determine whether flight plan data associated with the identifier is stored in the tamper-resistant distributed public ledger. The method includes, conditioned upon a determination that the flight plan data is stored in the tamper-resistant distributed public ledger, comparing the position to a flight path indicated by the flight plan data. The method includes selecting a characteristic of an icon corresponding to the aircraft based on a determination whether the position corresponds to the flight path. The method further includes displaying, on a display device and based on the characteristic, the icon at a location corresponding to the position.

In another particular implementation, an apparatus for verifying aircraft position information based on ADS-B messages includes a receiver configured to receive an ADS-B message indicating an identifier of an aircraft and indicating a position of the aircraft. The apparatus includes a processor coupled to the receiver and configured to access a tamper-resistant distributed public ledger of authenticated flight plan data to determine whether flight plan data associated with the identifier is stored in the tamper-resistant distributed public ledger. The processor is configured to, conditioned upon a determination that the flight plan data is stored in the tamper-resistant distributed public ledger, compare the position to a flight path indicated by the flight plan data. The processor is further configured to select a characteristic of an icon corresponding to the aircraft based on a determination whether the position corresponds to the flight path. The apparatus further includes a display device coupled to the processor and configured to display the icon based on the characteristic and at a location corresponding to the position.

In another particular implementation, a computer-readable storage device stores instructions that, when executed by a processor, cause the processor to perform operations including receiving an ADS-B message indicating an identifier of an aircraft and indicating a position of the aircraft. The operations include accessing a tamper-resistant distributed public ledger of authenticated flight plan data to determine whether flight plan data associated with the identifier is stored in the tamper-resistant distributed public ledger. The operations include, conditioned upon a determination that the flight plan data is stored in the tamper-resistant distributed public ledger, comparing the position to a flight path indicated by the flight plan data. The operations include selecting a characteristic of an icon corresponding to the aircraft based on a determination whether the position corresponds to the flight path. The operations further include initiating display, on a display device and based on the characteristic, of the icon at a location corresponding to the position.

DETAILED DESCRIPTION

Figure 1:
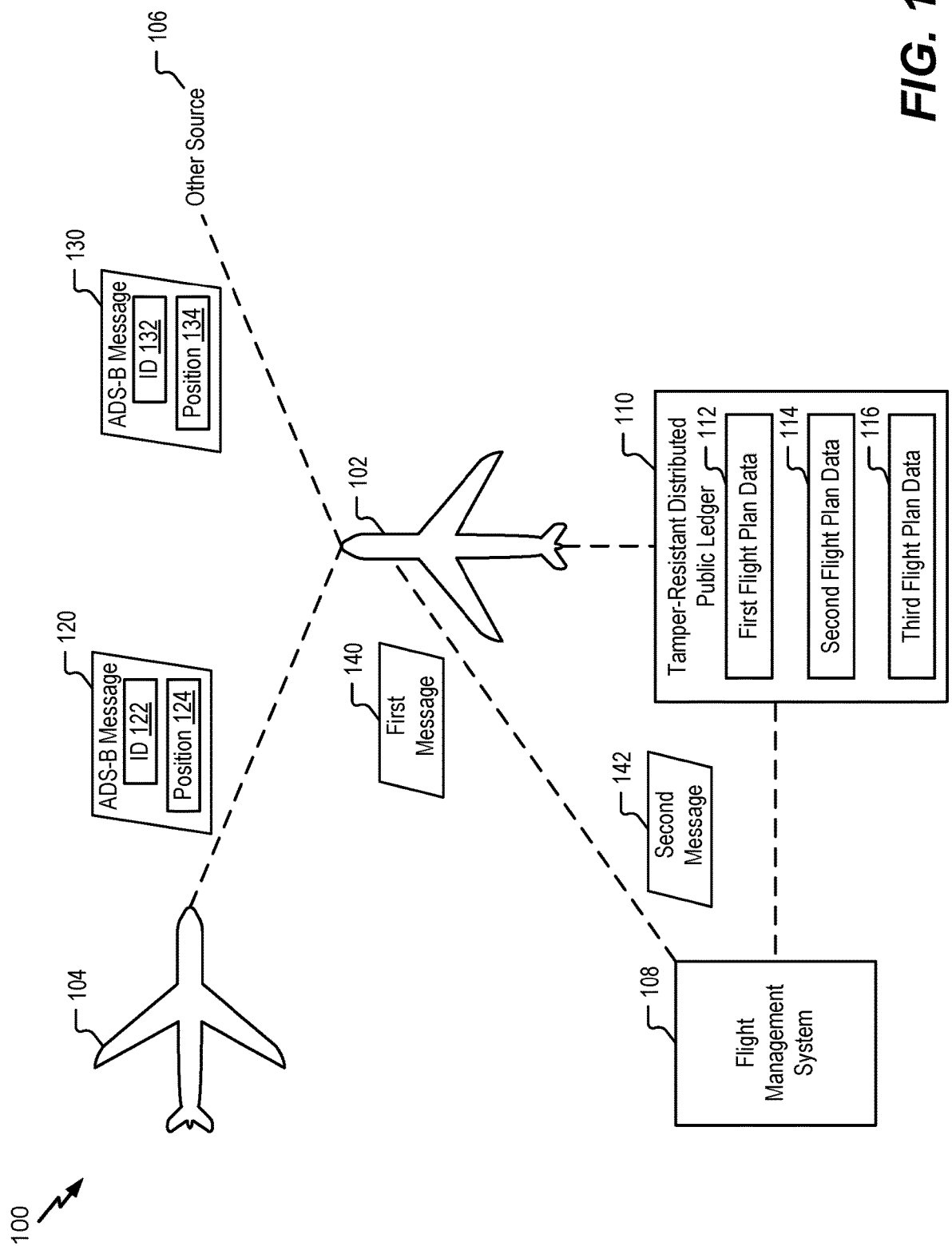
FIG. 1 is a diagram that illustrates use of ADS-B messages and a tamper-resistant distributed public ledger to verify aircraft position information.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The present disclosure describes systems and methods to verify aircraft position information based on ADS-B messages. The position information included in ADS-B messages is verified through accessing of a tamper-resistant distributed public ledger (e.g., a blockchain) that is used to store flight plan data for flights in a related geographical area. To illustrate, a first aircraft (or an air traffic control (ATC) station) receives an ADS-B message indicating an identifier of a second aircraft and a position of the second aircraft. Additionally, a ground-based flight management system maintains a tamper-resistant distributed public ledger (e.g., a blockchain) of flight plan data by adding entries each time a flight plan (or a group of flight plans) is received. The first aircraft (or ATC station) accesses the tamper-resistant distributed public ledger to determine whether flight plan data for the identifier of the second aircraft is stored therein. If the flight plan data exists (e.g., is stored in the tamper-resistant distributed public ledger), the first aircraft (or the ATC station) compares the position of the second aircraft indicated by the ADS-B message to a flight path indicated by the flight plan data.

If the position matches (within a threshold) a position along the flight path, the first aircraft (or the ATC station) displays an icon corresponding to the second aircraft on a display screen. The icon has a first characteristic, such as a first color, border, shading, size, shape, or a combination thereof, to indicate that the position of the second aircraft has been confirmed. If the position does not match a position along the flight path (or if flight plan data corresponding to the identifier of the second aircraft is not stored in the tamper-resistant distributed public ledger), the aircraft (or the ATC station) displays the icon with a second characteristic to indicate that the position of the second aircraft has not been confirmed. The aircraft (or the ATC station) can then take additional steps to confirm whether or not the position of the second aircraft is accurate, such as by querying the flight management system (which may have more up-to-date information indicating that the second aircraft is in an unexpected position or may be able to attempt contact with the second aircraft, if it exists and is not the result of a malicious actor, to confirm the position). Thus, the techniques of the present disclosure enable verification of position information indicated by ADS-B messages using a tamper-resistant distributed public ledger, which improves security of the ADS-B technology.

FIG. 1 illustrates an example of a particular implementation of a system 100 that verifies position information based on ADS-B messages. The system 100 includes a first aircraft 102, a second aircraft 104, a flight management system 108, and a tamper-resistant distributed public ledger 110 (e.g., a blockchain). As further described herein, operations of the first aircraft 102 and the second aircraft 104 are performed by components of the respective aircraft, such as a processor, a receiver, a transmitter, etc.

The flight management system 108 is included or integrated in a ground-based station, such as a station operated by a government agency, a station operated by one or more airlines, an ATC station, or any other type of ground-based station. In some implementations, the flight management system 108 includes or corresponds to a desktop computer, a laptop computer, a tablet computer, a server, a mainframe, a mobile device (e.g., a mobile telephone), or any other type of computing device.

The flight management system 108 is configured to generate and maintain the tamper-resistant distributed public ledger 110. For example, the flight management system 108 is configured to receive flight plans from one or more airlines, either from ground-based systems or from the aircraft themselves. The flight management system 108 is configured to authenticate the flight plans. For example, each airline may be issued a private key, and flight plan data received from the airline can be digitally signed using the private key. The flight management system 108 verifies the digital signature using a public key associated with the airline. In this manner, correct verification of the digital signature of the flight plan data serves as authentication of the flight plan data (e.g., via the use of public and private keys). In other implementations, other techniques for authenticating the flight plan data are used.

After authenticating the received flight plan data, the flight management system 108 is configured to generate one or more entries in the tamper-resistant distributed public ledger 110 conditioned upon authentication of the received flight plan data. To illustrate, the flight management system 108 generates an entry in the tamper-resistant distributed public ledger 110 that includes the received flight plan data. Each entry in the tamper-resistant distributed public ledger 110 includes flight plan data for one or more aircraft during a particular time period. In a particular implementation, the entries in the tamper-resistant distributed public ledger 110 correspond to a particular geographic region. For example, different tamper-resistant distributed public ledgers can be maintained for storing flight plan data for different geographic regions.

To illustrate, the tamper-resistant distributed public ledger 110 is shared in a distributed manner between the flight management system 108, aircraft, ATC stations, airline systems, government systems, and other systems (e.g., across a plurality of devices). In a particular implementation, each of the systems stores an instance of the tamper-resistant distributed public ledger 110 in a local memory of the respective system. In other implementations, the flight management system 108 stores the tamper-resistant distributed public ledger and each portion is replicated across multiple systems in a manner that maintains security of the tamper-resistant distributed public ledger 110 as a public (i.e., available to other devices) and incorruptible (or tamper-resistant/evident) ledger.

The tamper-resistant distributed public ledger 110 stores flight plan data for a plurality of flight plans of a plurality of aircraft during a particular time period and for a particular geographic region. In a particular implementation, each entry in the tamper-resistant distributed public ledger 110 specifies an identifier, a corresponding point of arrival, a corresponding point of departure, a corresponding flight path, a corresponding altitude, or a combination thereof. Additionally, each entry in the tamper-resistant distributed public ledger 110 includes a hash value corresponding to a previous entry in the tamper-resistant distributed public ledger 110. For example, each entry includes information that identifies the entry (e.g., an entry/block ID) and enables another device or system to confirm the integrity of the tamper-resistant distributed public ledger 110. For example, the entry ID can include or correspond to the result of a hash function (e.g., a Secure Hashing Algorithm 256 (SHA-256) hash function, a RACE Integrity Primitives Evaluation Message Digest (RIPEMD) hash function, a Message Digest Algorithm 5 (MD5) hash function, or a BLAKE2 hash function, as non-limiting examples) based on the flight plan data in the entry and based on an entry ID from the prior entry (e.g., block) of the tamper-resistant distributed public ledger 110 (e.g., the blockchain). For example, in FIG. 1, a first entry including the first flight plan data 112 includes a hash value based on the first flight plan data 112. A second entry including the second flight plan data 114 includes a hash value based on the second flight plan data 114 and the hash value from the first entry. Similarly, a third entry includes a hash value based on the third flight plan data 116 and the hash value from the second entry. This chained arrangement of hash values enables each entry (e.g., block) to be validated with respect to the entire tamper-resistant distributed public ledger 110 (e.g., blockchain); thus, tampering with or modifying values in any entry of the tamper-resistant distributed public ledger 110 is evident by calculating and verifying the hash value of the final entry in the tamper-resistant distributed public ledger 110. Accordingly, the tamper-resistant distributed public ledger 110 acts as a public ledger of flight plan data.

In some implementations, each entry includes flight plan data for a single aircraft. In other implementations, the flight management system 108 bundles flight plans for multiple aircraft together in a single entry before adding the entry to the tamper-resistant distributed public ledger 110, for example in accordance with an entry adding (e.g., a block adding) scheme. For example, the flight management system 108 is configured to determine when an entry (e.g., block) adding trigger satisfies an entry adding condition. The entry adding trigger can include or correspond to a number of received flight plans, a time interval since the last entry was added to the tamper-resistant distributed public ledger 110, another criterion, or a combination thereof. When the entry adding condition is satisfied (e.g., a threshold number of flight plans have been received or a threshold amount of time has elapsed), a new entry is generated and added to the tamper-resistant distributed public ledger 110. In a particular implementation, the flight management system 108 includes a flight plan data buffer to store received flight plan data until the entry adding trigger satisfies the entry adding condition.

In a particular implementation, the flight management system 108 maintains the tamper-resistant distributed public ledger in accordance with an entry conflict resolution scheme. To illustrate, in implementations where multiple systems are capable of adding entries to the tamper-resistant distributed public ledger 110, entry conflicts can arise. An entry (e.g., block) conflict refers to a circumstance in which a first system forms and sends a first entry, and simultaneously or near simultaneously, a second system forms and sends a second entry that is different than the first entry. In this circumstance, some systems receive the first entry while other systems receive the second entry before the first entry. In this circumstance, both the first entry and the second entry are provisionally added to the tamper-resistant distributed public ledger 110, causing the tamper-resistant distributed public ledger 110 to branch. The branching is resolved when the next entry is added to the end of one of the branches such that one branch is longer than the other (or others). In this circumstance, the longest branch is designated as the main branch. When the longest branch is selected, any flight plan data that is in an entry corresponding to a shorter branch and that is not accounted for in the longer branch is returned to the flight management system 108 (e.g., to the flight plan data buffer) for inclusion in a subsequent entry.

Entries in the tamper-resistant distributed public ledger 110 are not encrypted. Thus, the tamper-resistant distributed public ledger is available to the public, such as to aircraft (e.g., the first aircraft 102 and the second aircraft 104), ATC stations, airlines, and government agency systems. Additionally, although the flight management system 108 is described as maintaining (e.g., adding entries to) the tamper-resistant distributed public ledger 110, in other implementations, other systems can share in maintaining the tamper-resistant distributed public ledger 110 provided the other systems are configured to authenticate received flight plan data and to perform in accordance with the rules (e.g., the entry adding scheme, the conflict resolution scheme, etc.) of the tamper-resistant distributed public ledger 110.

In the example of FIG. 1, the flight management system 108 receives flight plan data for the first aircraft 102, the second aircraft 104, and a third aircraft. Based on the flight plan data associated with the first aircraft 102, the flight management system 108 generates an entry in the tamper-resistant distributed public ledger 110 including first flight plan data 112. Based on the flight plan data associated with the second aircraft 104, the flight management system 108 generates an entry in the tamper-resistant distributed public ledger 110 including second flight plan data 114. Based on the flight plan data associated with the third aircraft, the flight management system 108 generates an entry in the tamper-resistant distributed public ledger 110 including third flight plan data 116. In other implementations, the flight management system 108 generates a single entry that includes the first flight plan data 112, the second flight plan data 114, and the third flight plan data 116.

The flight management system 108 maintains the tamper-resistant distributed public ledger to enable aircraft, ATC stations, or other entities to verify position data in received ADS-B messages. In the example of FIG. 1, during flight, the first aircraft 102 receives an ADS-B message 120 from the second aircraft 104. The ADS-B message 120 indicates an identifier 122 of the second aircraft and a position 124

(e.g., a latitude and a longitude) of the second aircraft. Although not illustrated, ADS-B messages can include other information, such as altitude, bearing, and speed, as non-limiting examples. In a particular implementation, ADS-B messages are not encrypted when received (or transmitted) to enable public access to the position data indicated within.

To illustrate, in a particular implementation, the second aircraft 104 includes a positioning system, such as a GPS receiver, that is configured to determine a position of the second aircraft 104. The second aircraft 104 is configured to determine its position and to indicate its position by periodically transmitting ADS-B messages, such as the ADS-B message 120, using a transmitter. Additionally, although the first aircraft 102 is described as receiving ADS-B messages, the first aircraft 102, in some implementations, is also includes a GPS receiver or other positioning system and the first aircraft 102 is configured to determine its position and to indicate the position by transmitting ADS-B messages.

After receiving the ADS-B message 120 from the second aircraft 104, the first aircraft 102 accesses the tamper-resistant distributed public ledger 110 to determine whether flight plan data associated with the identifier 122 is stored in the tamper-resistant distributed public ledger 110. For example, the first aircraft 102 determines whether any of the flight plan data stored in the tamper-resistant distributed public ledger 110 includes the identifier 122. If flight plan data stored in the tamper-resistant distributed public ledger 110 matches the identifier 122, the first aircraft 102 compares the position 124 to a flight path indicated by matching flight plan data. For example, conditioned on a determination that the second flight plan data 114 specifies the identifier 122, the first aircraft 102 compares the position 124 to the flight path indicated by the second flight plan data 114.

The position 124 corresponds to the flight path if the position 124 is within a threshold distance of an expected position along the flight path. For example, the flight path may indicate a plurality of positions, and the first aircraft 102 compares the position 124 (indicated by the ADS-B message 120) to each position indicated by the flight path to determine whether the position 124 is within a threshold distance of at least one position indicated by the flight path.

Based on the comparison, the first aircraft 102 selects a characteristic of an icon to represent to the second aircraft 104 in an information display. The characteristic includes a color, a border, a shading, a size, a shape, or a combination thereof, of the icon. To illustrate, if the position 124 corresponds to a position along the flight path indicated by the second flight plan data 114, the first aircraft 102 selects a first color (e.g., a first characteristic) for the icon corresponding to the second aircraft 104. Icons with the first characteristic indicate that the position information of the corresponding aircraft has been verified. The first aircraft then displays, on a display device and based on the characteristic, the icon at a location corresponding to the position. For example, the display device is configured to display icons of aircraft in an airspace of the first aircraft 102. Icons that are displayed with the first characteristic (e.g., the first color) indicate aircraft for which position information has been verified. Icons that are displayed with a second characteristic (e.g., a second color) indicate aircraft for which position information has not been verified, for which additional actions can be taken, as further described herein.

To illustrate, in the example of FIG. 1, the first aircraft 102 also receives an ADS-B message 130 from another source 106. In this example, the other source 106 is a malicious actor, such as a hacker, and is not from an aircraft that is properly transmitting ADS-B messages. The ADS-B message 130 includes an identifier 132 of a third aircraft and a position 134 of the third aircraft. However, in this example, the ADS-B message 130 is malicious message, and the third aircraft is not actually located at the position 134.

Instead of simply processing the ADS-B message 130 and displaying an icon corresponding to the third aircraft, which would provide the pilot with an incorrect representation of the airspace, the first aircraft 102 accesses the tamper-resistant distributed public ledger 110 for verification of the ADS-B message 130. To illustrate, the first aircraft 102 determines whether any flight plan data stored in the tamper-resistant distributed public ledger 110 matches the identifier 132. Because there is a flight plan corresponding to the third aircraft, the first aircraft 102 is able to match the identifier 132 to the third flight plan data 116.

Next, the first aircraft 102 compares the position 134 to a flight path indicated by the third flight plan data 116. Because the position 134 is selected by a malicious actor, the position 134 is not related to a flight path of the third aircraft. Based on a determination that the position 134 does not correspond to any position indicated by the flight path of the third flight plan data 116, the first aircraft 102 selects a characteristic (e.g., a second color) for an icon that corresponds to the third aircraft and initiates display of the icon based on the selected characteristic. For example, the display device of the first aircraft 102 displays a second icon having a second color, the second icon corresponding to the third aircraft. Additionally, if the identifier 132 does not match an identifier indicated by flight plan data stored at the tamper-resistant distributed public ledger 110, the first aircraft selects the second color for an icon corresponding to the third aircraft (e.g., because the position 134 cannot be verified by flight plan data). Because the icon has the second color, a pilot looking at the display device is able to understand that the position of the third aircraft failed verification, and the pilot can have a better understanding of the airspace around the first aircraft 102.

In situations where the position information indicated in an ADS-B message fails verification, the first aircraft 102 can perform additional actions to attempt to verify the position. To illustrate, the first aircraft 102 transmits a first message 140 to the flight management system 108. The first message 140 is transmit conditioned upon a determination that the position 134 fails to correspond to a flight path indicated by the third flight plan data 116 (or a determination that no flight plan data stored at the tamper-resistant distributed public ledger 110 matches the identifier 132). In a particular implementation, the first message 140 includes the identifier 132 and the position 134.

The flight management system 108 is configured to receive the first message 140 and to attempt to verify the position 134. For example, the flight management system 108 can have access to an updated flight plan for the third aircraft that has not yet been added to the tamper-resistant distributed public ledger 110. Additionally, or alternatively, the flight management system 108 can receive information that the aircraft is off course. The information can be received from an airline or an ATC station. Thus, the flight management system 108 can store or have access to information indicating the position of the third aircraft. If the flight management system 108 does not have access to such information, the flight management system 108 can also attempt to communicate with the third aircraft to confirm its position directly from the third aircraft. After verifying (or failing to verify) the position of the third aircraft, the flight management system 108 generates and sends a second message 142 to the first aircraft 102. The second message 142 confirms whether or not the position 134 is verified.

The first aircraft 102 updates display of the icon corresponding to the third aircraft based on the second message 142. For example, if the second message 142 indicates that the position 134 is verified, the first aircraft 102 modifies the characteristic of the icon (e.g., changes the icon from the second color to the first color) to indicate that the position of the third aircraft is verified. As another example, if the second message 142 indicates that the third aircraft does not exist or that the position 134 failed verification (e.g., that the ADS-B message 130 is not a legitimate ADS-B message), the first aircraft 102 removes the icon corresponding to the third aircraft from the display device or changes to a third characteristic for display. Thus, if an ADS-B message fails verification by the first aircraft 102 and the flight management system 108, the message is interpreted as malicious and inaccurate, and no icon is displayed at the display device. In other implementations, the icon remains with the second characteristic.

Verifying whether position data included in an ADS-B message is correct using the tamper-resistant distributed public ledger 110 provides a method for identifying ADS-B messages provided by malicious actors. Because the tamper-resistant distributed public ledger 110 is maintained by the flight management system 108 and because each entry contains a hash value that indicates a previous entry, the flight plan data stored in the tamper-resistant distributed public ledger 110 can be trusted to be authenticated and accurate. Thus, aircraft, ATC stations, or other recipients of ADS-B messages can verify the position data contained therein and ignore malicious ADS-B messages, which improves security of ADS-B technology without requiring encrypting or other techniques that would reduce the transparency of the ADS-B technology.

Figure 2:
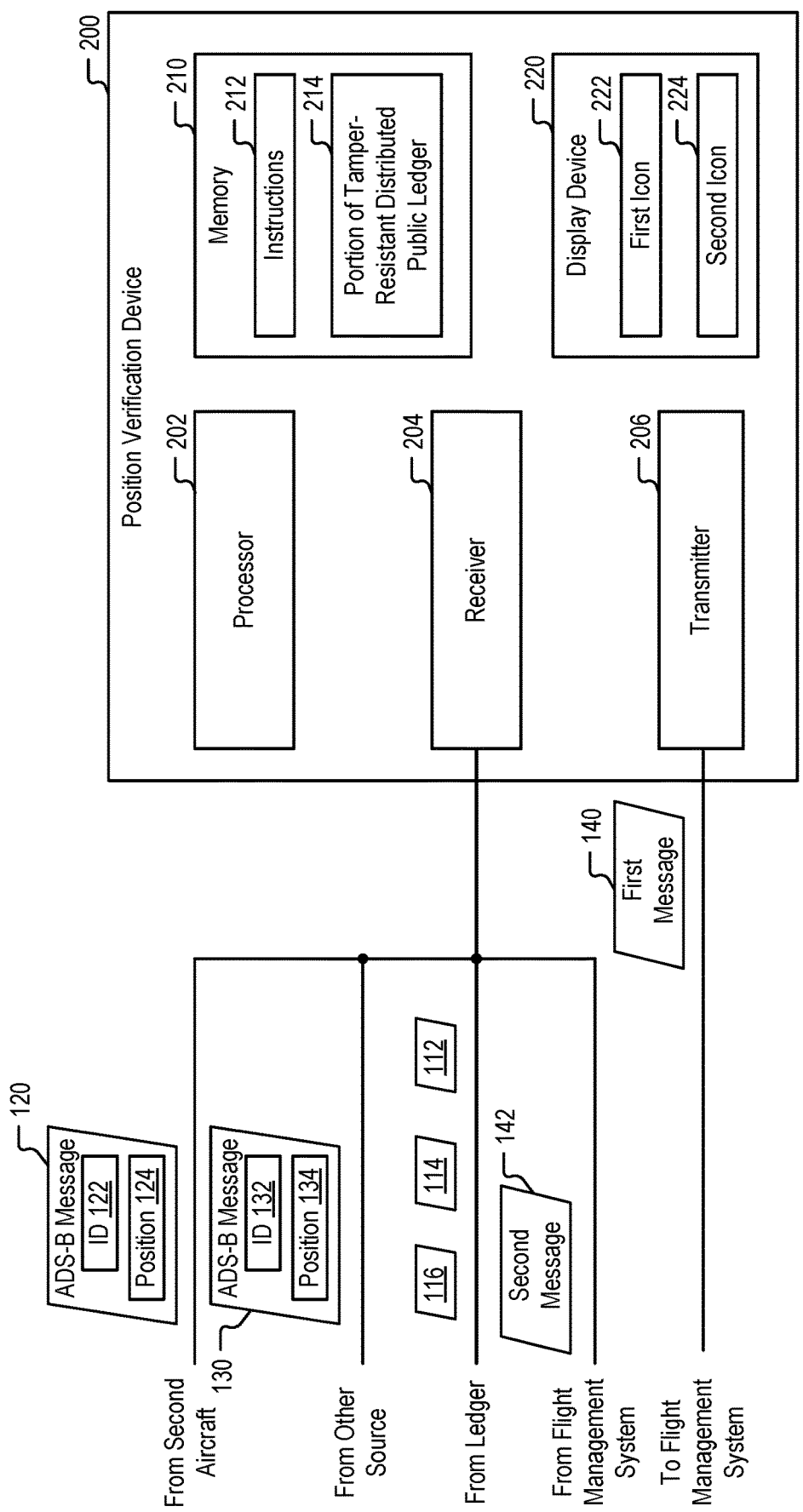
FIG. 2 illustrates a diagram of a particular implementation of a position verification system.

FIG. 2 illustrates an example of a position verification system 200. In a particular implementation, the position verification system 200 is included or integrated in an aircraft, such as the first aircraft 102 of FIG. 1. In another particular implementation, the position verification system 200 is included or integrated in or coupled to an ATC station or other ground-based station that receives ADS-B messages. In some implementations, the position verification system 200 includes or corresponds to a desktop computer, a laptop computer, a tablet computer, a server, a mainframe, a mobile device (e.g., a mobile telephone), a component of a vehicle, or any other type of computing device.

The position verification system 200 includes a processor 202, a receiver 204, a transmitter 206, a memory 210, and a display device 220. In other implementations, the position verification system 200 includes additional components, such as input/output interfaces, etc. Alternatively, one or more components can be external to the position verification system 200. For example, in some implementations, the display device 220 is external to the position verification system 200.

The processor 202 is configured to execute instructions 212 stored at the memory 210 to perform the operations described herein. For example, the processor 202 verifies position data indicated by ADS-B messages, as further described herein.

The transmitter 206 is configured to enable the position verification system 200 to send data to one or more other devices via direct connection or via one or more networks, and the receiver 204 is configured to enable the position verification system 200 to receive data from one or more other devices via direct connection or via one or more networks. The one or more networks may include Institute of Electrical and Electronics Engineers (IEEE) 802 wireless networks, Bluetooth networks, telephone networks, satellite networks, optical or radio frequency networks, or other wired or wireless networks. Although illustrated as distinct components, in other implementations, the transmitter 206 and the receiver 204 are replaced with a transceiver that enables sending and receipt of data from one or more other devices.

In a particular implementation, the receiver 204 is configured to receive ADS-B messages from aircraft (or other sources). For example, the receiver 204 receives the ADS-B message 120 and the ADS-B message 130, as described with reference to FIG. 1. The ADS-B messages are processed by the processor 202, as further described herein.

The memory 210 includes volatile memory devices (e.g., random access memory (RAM) devices), nonvolatile memory devices (e.g., read-only memory (ROM) devices, programmable read-only memory, and flash memory), or both. The memory 210 is configured to store the instructions 212 that are executed by the processor 202 to perform the operations described herein. In some implementations, the memory 210 is also configured to at least a portion of a tamper-resistant distributed public ledger, such as the tamper-resistant distributed public ledger 110 of FIG. 1.

The display device 220 includes a display screen that is configured to display icons corresponding to aircraft. In a particular implementation, the display device 220 includes a display screen, a liquid crystal display (LCD) screen, a touchscreen, or any other type of display device. In a particular implementation in which the position verification system 200 is included in an aircraft, the display device 220 can include a primary flight display (PFD) or a traffic collision avoidance system (TCAS) display. In another particular implementation in which the position verification system 200 is included in an ATC station, the display device 220 can include a radar screen.

During operation, the receiver 204 receives ADS-B messages. For example, the receiver 204 receives the ADS-B message 120 (e.g., from the second aircraft 104 of FIG. 1) and the ADS-B message 130 (e.g., from the other source 106 of FIG. 1). The ADS-B message 120 indicates the identifier 122 of the second aircraft 104 and the position 124 of the second aircraft 104. The ADS-B message 130 indicates the identifier 132 of the third aircraft and the position 134 of the third aircraft. However, as described with reference to FIG. 1, the ADS-B message 130 is generated by a malicious actor, and the third aircraft is not actually located at the position 134.

The processor 202 accesses the tamper-resistant distributed public ledger 110 of FIG. 1 to determine whether flight plan data associated with identifiers indicated by the ADS-B messages are stored in the tamper-resistant distributed public ledger 110. For example, the processor 202 compares an identifier indicated by the ADS-B messages to identifiers specified by entries in the tamper-resistant distributed public ledger 110. For example, the receiver 204 receives the first flight plan data 112, the second flight plan data 114, and the third flight plan data 116 from the tamper-resistant distributed public ledger 110. In some implementations, the first flight plan data 112, the second flight plan data 114, the third flight plan data 116, or a combination thereof, is stored at the memory 210 as the portion of the tamper-resistant distributed public ledger 214.

If the identifier matches an identifier included in an entry, the processor 202 compares the position indicated by the ADS-B message to a flight path included in the entry to determine whether the position corresponds to the flight path. If the position corresponds to the flight path, the processor 202 selects a first characteristic (e.g., a first color, a first shading, a first border, etc.) for an icon for display at the display device 220. The icon having the first characteristic indicates that the position information of the corresponding aircraft has been verified. If the position does not correspond to the flight path (or if the identifier indicated by the ADS-B message does not match an identifier specified by any of the entries in the tamper-resistant distributed public ledger 110), the processor 202 selects a second characteristic (e.g., a second color, a second shading, a second border, etc.) for the icon for display at the display device 220. The icon having the second characteristic indicates that the position information of the corresponding aircraft has failed verification.

To illustrate, in a first example, the receiver 204 receives the ADS-B message 120 from the second aircraft 104. The processor 202 accesses the tamper-resistant distributed public ledger 110 to determine whether the identifier 122 matches an identifier specified by flight plan data stored in the tamper-resistant distributed public ledger 110. The processor 202 compares the identifier 122 to the first flight plan data 112, the second flight plan data 114, and the third flight plan data 116 to determine whether the identifier 122 matches an identifier specified by any of the flight plan data 112-116. In this example, the identifier 122 matches an identifier specified by the second flight plan data 114 (e.g., flight plan data corresponding to the second aircraft 104). Conditioned upon a determination that the identifier 122 matches the identifier specified by the second flight plan data 114, the processor 202 compares the position 124 to a flight path specified by the second flight plan data 114. In this example, the position 124 corresponds to the flight path. Thus, the processor 202 selects a first characteristic (e.g., a first color, a first shading, a first border, etc.) for displaying a first icon 222 the corresponds to the second aircraft 104. The display device 220 displays the first icon 222 at a location on the display device that corresponds to the position 124. Using the first characteristic to display the first icon 222 indicates to a pilot that the position information corresponding to the first icon 222 is verified.

In a second example, the receiver 204 receives the ADS-B message 130 from the other source 106. The processor 202 accesses the tamper-resistant distributed public ledger 110 to determine whether the identifier 132 matches an identifier specified by flight plan data stored in the tamper-resistant distributed public ledger 110. The processor 202 compares the identifier 132 to the first flight plan data 112, the second flight plan data 114, and the third flight plan data 116 to determine whether the identifier 132 matches an identifier specified by any of the flight plan data 112-116. In this example, the identifier 132 matches an identifier specified by the third flight plan data 116 (e.g., flight plan data corresponding to the third aircraft). Conditioned upon a determination that the identifier 132 matches the identifier specified by the third flight plan data 116, the processor 202 compares the position 124 to a flight path specified by the third flight plan data 116. In this example, the position 134 does not correspond to the flight path. Thus, the processor 202 selects a second characteristic (e.g., a second color, a second shading, a second border, etc.) for displaying a second icon 224 that corresponds to the third aircraft. The display device 220 displays the second icon 224 at a location on the display device that corresponds to the position 134. Using the second characteristic to display the second icon 224 indicates to a pilot that the position information corresponding to the second icon 224 failed verification.

In some implementations, the position verification system 200 can perform additional operations to attempt to verify the position 134 of the ADS-B message 130. For example, the transmitter 206 is configured to, conditioned on a determination that the position 134 fails to correspond to the flight path of that flight plan data associated with the identifier 132 is not stored in the tamper-resistant distributed public ledger 110, transmit the first message 140 to the flight management system 108 of FIG. 1 to confirm the position of the third aircraft. The first message 140 includes the identifier 132 and the position 134, as well as any other information from the ADS-B message 130. As described with reference to FIG. 1, the flight management system 108 can have more up-to-date information than the tamper-resistant distributed public ledger 110 or the flight management system 108 can attempt to directly communicate with the third aircraft. Responsive to transmitting the first message 140, the receiver 204 receives the second message 142 from the flight management system 108. The second message 142 either confirms that the position 134 is correct or indicates that the position 134 failed verification.

Based on the second message 142, the processor 202 modifies the second icon 224. For example, if the second message 142 indicates that the position 134 is correct, the processor 202 modifies the second icon 224 to have the first characteristic (e.g., the first color, the first shading, the first border, etc.) instead of the second characteristic. Alternatively, if the second message 142 indicates that the position 134 fails verification, the second icon 224 is removed from the display device 220. In other implementations, the second icon 224 remains with the second characteristic or is modified to have a third characteristic.

The position verification system 200 thus enables display of icons corresponding to aircraft such that the icons have different characteristics (e.g., colors, shadings, borders, etc.) based on whether position information corresponding to the aircraft has been verified. A pilot or air traffic controller can quickly and easily ascertain, from the icons, which aircraft have been verified and which aircraft could be the result of malicious messages. Thus, the pilot or aircraft controller can maintain appropriate awareness of the airspace.

Figure 3:
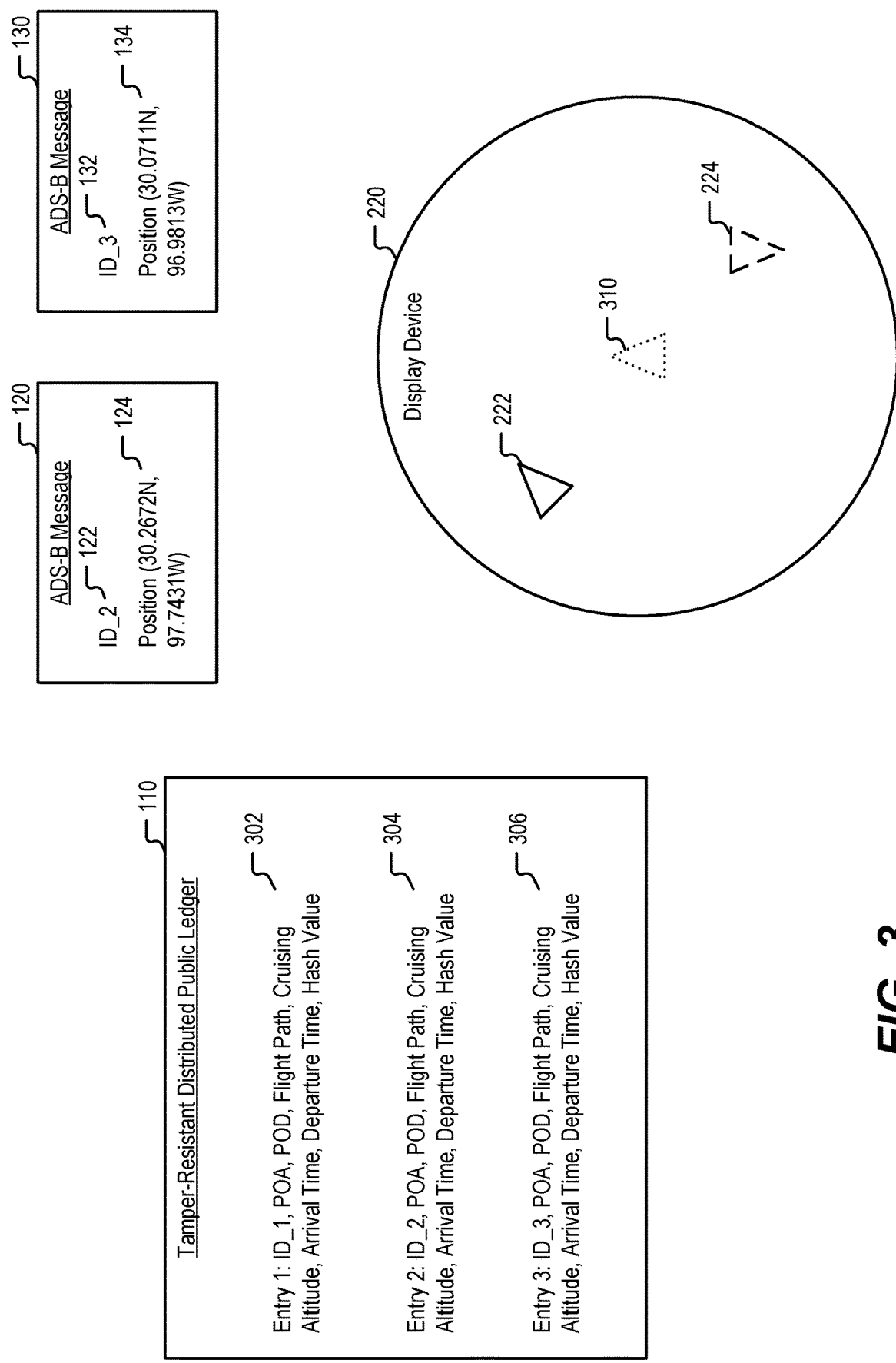
FIG. 3 illustrates generation of icons on a display device based on information retrieved from a tamper-resistant distributed public ledger and ADS-B messages.

FIG. 3 illustrates generation of icons on a display device based on information retrieved from a tamper-resistant distributed public ledger and ADS-B messages. In the example of FIG. 3, the tamper-resistant distributed public ledger 110 includes flight plan information entries, including a first flight plan information entry 302, a second flight plan information entry 304, and a third flight plan information entry 306. The flight plan information entries 302-306 correspond to the information specified by the flight plan data 112-116 of FIGS. 1-2.

In the example of FIG. 3, each flight plan information entry includes an identifier, a point of arrival (POA), a point of departure (POD), a flight path, a cruising altitude, an arrival time, a departure time, and a hash value. In other implementations, one or more of these elements are optional or additional information is included. Each flight plan information entry corresponds to a different aircraft. For example, the first flight plan information entry 302 corresponds to a first aircraft with an identifier "ID_1" (e.g., the first aircraft 102 of FIG. 1), the second flight plan information entry 304 corresponds to a second aircraft with an identifier ("ID_2") (e.g., the second aircraft 104 of FIG. 1), and the third flight plan information entry 306 corresponds to a third aircraft with a third identifier "ID_3."

As described with reference to FIG. 2, the position verification system 200 receives the ADS-B message 120 from the second aircraft 104 of FIG. 1. The ADS-B message 120 includes the identifier 122 ("ID_2") and the position 124 (e.g., 30.2672N, 97.7431W). The position verification system 200 analyzes the flight plan information entries 302-306 to determine if any include the identifier 122. Because the second flight plan information entry 304 includes "ID_2," the position verification system 200 compares the position 124 to the flight path included in the second flight plan information entry 304 to determine whether the position 124 corresponds to the flight path. If the position 124 corresponds to (e.g., is within a threshold distance of a position included in) the flight path, the position verification system 200 selects a first characteristic (e.g., a first border) for use in displaying the first icon 222.

Additionally, the position verification system 200 receives the ADS-B message 130 from the other source 106 of FIG. 1. The ADS-B message 130 includes the identifier 132 ("ID_3") and the position 134 (e.g., 30.0711N, 96.9813W). The position verification system 200 analyzes the flight plan information entries 302-306 to determine if any include the identifier 132. Because the third flight plan information entry 306 includes "ID_3," the position verification system 200 compares the position 134 to the flight path included in the third flight plan information entry 306 to determine whether the position 134 corresponds to the flight path. If the position 134 does not correspond to the flight path, the position verification system 200 selects a second characteristic (e.g., a second border) for use in display the second icon 224.

The display device 220 displays icons corresponding to aircraft in a particular geographic region, such as a region around the position verification system 200. In a particular implementation in which the position verification system 200 is integrated within a first aircraft, the display device 220 displays an icon 310 that corresponds to the position of the first aircraft. The display device 220 also displays the first icon 222 and the second icon 224. The first icon 222 is displayed at a location on the display device 220 that corresponds to the position 124, and the second icon is displayed at a location on the display device 220 that corresponds to the position 134. As illustrated in FIG. 3, the first icon 222 has a first border (e.g., a straight-line border) and the second icon 224 has a second border (e.g., a dotted-line border). In other implementations, the first icon 222 and the second icon 224 can be distinguished by other characteristics, such as different colors, different shadings, different sizes, different shapes, etc. The border of the first icon 222 indicates that the position of the corresponding aircraft has been verified, and the border of the second icon 224 indicates that the position of the corresponding aircraft has failed verification. In some implementations, responsive to a message from the flight management system 108 (e.g., the second message 142), the second icon 224 can be modified, such as by changing the border if the position information is verified or removing the second icon 224 if the position information fails to be verified by the flight management system 108.

Figure 4:
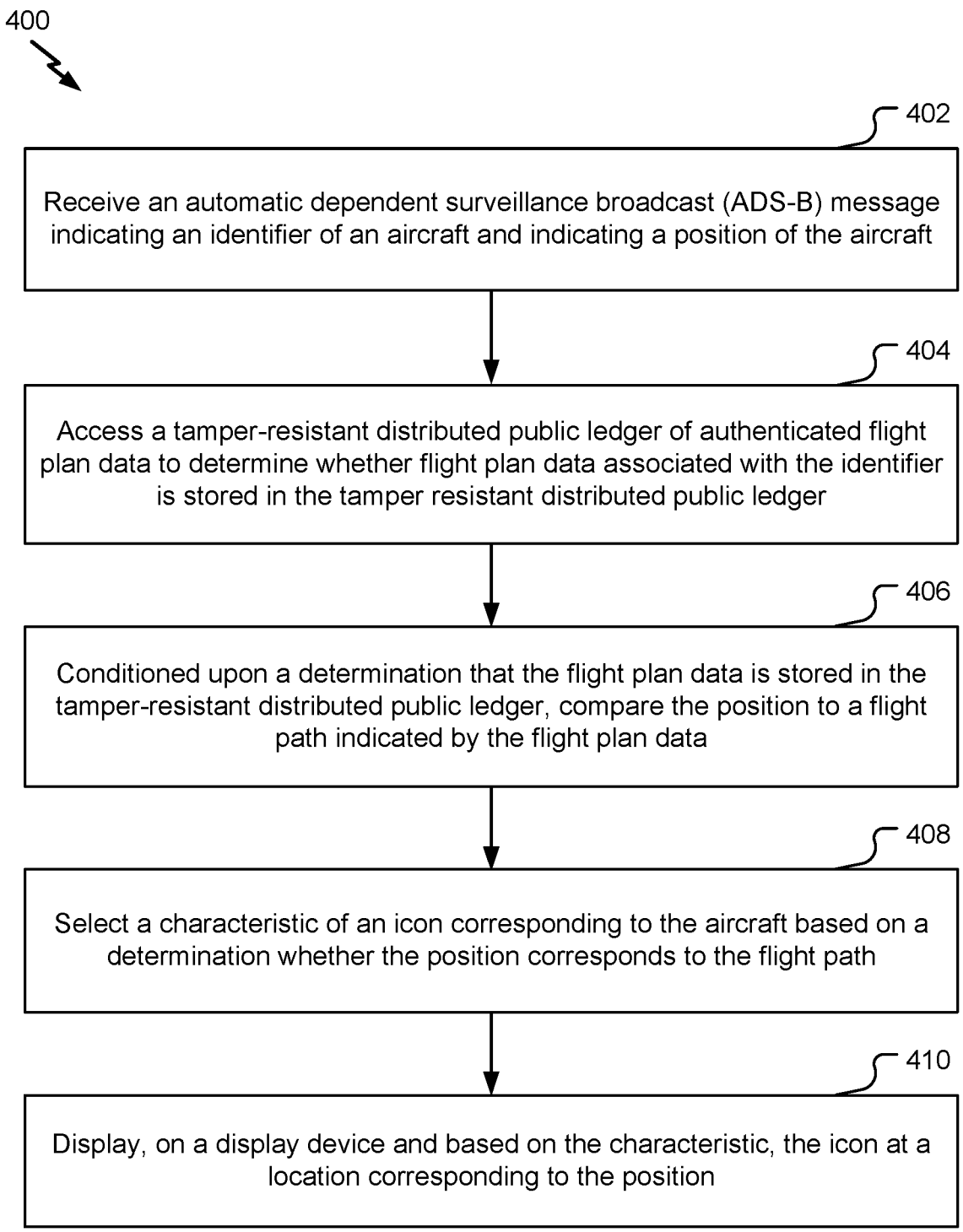
FIG. 4 is a flow chart of an example of a method of verifying aircraft position information based on ADS-B messages.

FIG. 4 illustrates a method 400 of verifying aircraft position information based on ADS-B messages. In a particular implementation, the method 400 is performed by the first aircraft 102 of FIG. 1 (or an air traffic control station) or by the position verification system 200 of FIG. 2 (e.g., by the processor 202 executing the instructions 212).

The method 400 includes receiving an ADS-B message indicating an identifier of an aircraft and indicating a position of the aircraft, at 402. For example, the first aircraft 102 or the processor 202 receives the ADS-B message 120 indicating the identifier 122 and the position 124. In a particular implementation, the ADS-B message is not encrypted when received.

The method 400 includes accessing a tamper-resistant distributed public ledger of authenticated flight plan data to determine whether flight plan data associated with the identifier is stored in the tamper-resistant distributed public ledger, at 404. For example, the first aircraft 102 or the processor 202 accesses the tamper-resistant distributed public ledger 110 to determine whether the first flight plan data 112, the second flight plan data 114, or the third flight plan data 116 is associated with the identifier 122.

The method 400 includes, conditioned upon a determination that the flight plan data is stored in the tamper-resistant distributed public ledger, comparing the position to a flight path indicated by the flight plan data, at 406. For example, the first aircraft 102 or the processor 202, conditioned upon a determination that the identifier 122 is associated with the second flight plan data 114, compares the position 124 to a flight path indicated by the second flight plan data 114.

The method 400 includes selecting a characteristic of an icon corresponding to the aircraft based on a determination whether the position corresponds to the flight path, at 408. For example, the processor 202 determines a characteristic of the first icon 222 based on whether the position 124 corresponds to the flight path. In a particular implementation, the characteristic includes a color, a border, a shading, a size, a shape, another characteristic, or a combination thereof. In a particular implementation, the position corresponds to the flight path based on the position being within a threshold distance of an expected position along the flight path.

The method 400 further includes displaying, on a display device and based on the characteristic, the icon at a location corresponding to the position, at 410. For example, the processor 202 initiates display of the first icon 222 via the display device 220 at a location that corresponds to the position 124. The first icon 220 has the first characteristic selected by the processor 202.

In a particular implementation, the method 400 includes, conditioned upon a determination that the position fails to correspond to the flight path or that the flight plan data is not stored in the tamper-resistant distributed public ledger, transmitting a message to a flight management system to confirm the position of the aircraft. For example, if the position 124 fails to correspond to the flight path of the corresponding flight plan data, or if there is no flight plan data stored at the tamper-resistant distributed public ledger 110 that matches the identifier 122, the first aircraft (or the transmitter 206) transmits the first message 140 to the flight management system 108. In some implementations, the method 400 further includes, in response to receipt of a message confirming the position of the aircraft, modifying the characteristic of the icon. For example, in response to receipt of the second message 142 (and the second message 142 confirming the position 134), the processor 202 modifies the second icon 224 to have the first characteristic (e.g., a first color, shading, border, shape, size, etc.). In some implementations, the method 400 further includes, in response to receipt of a message indicating that the aircraft does not exist or that the position is incorrect, removing the icon. For example, in response to receipt of the second message 142 (and the second message 142 indicating that verification of the position 134 failed), the processor 202 removes the second icon 224 from the display device 220.

In a particular implementation, entries in the tamper-resistant distributed public ledger are not encrypted. Additionally, or alternatively, each entry in the tamper-resistant distributed public ledger includes flight plan data for one or more aircraft during a particular time period. The flight plan data for a particular aircraft specifies a corresponding point of arrival, a corresponding point of departure, a corresponding flight path, a corresponding altitude, or a combination thereof. For example, the first flight plan data 112, the second flight plan data 114, and the third flight plan data 116 include flight plan data for aircrafts during a particular time period, such as a POA, a POD, a flight path, an altitude, an arrival time, a departure time, or a combination thereof, as illustrated in FIG. 3. Additionally, or alternatively, each entry in the tamper-resistant distributed public ledger 110 includes a hash value corresponding to a previous entry in the tamper-resistant distributed public ledger, as described with reference to FIG. 1.

In a particular implementation, entries in the tamper-resistant distributed public ledger are generated by a flight management system conditioned upon an authentication of corresponding flight plan data by the flight management system. For example, the flight management system 108 receives flight plan data from other sources, such as airlines, ATC stations, aircraft, etc., and the flight management system 108 authenticates the flight plan data before adding the authenticated flight plan data to the tamper-resistant distributed public ledger 110. In some implementations, the flight management system maintains the tamper-resistant distributed public ledger in accordance with an entry adding scheme, as described with reference to FIG. 1.

The method 400 improves security of ADS-B technology. For example, by verifying whether position data included in an ADS-B message is correct using a tamper-resistant distributed public ledger provides a method for determining if malicious actors provide inaccurate ADS-B messages. Thus, aircraft, ATC stations, or other recipients of ADS-B messages can verify the position data contained therein and ignore malicious ADS-B messages, which improves security of ADS-B technology without requiring encrypting or other techniques that would reduce the transparency of the ADS-B technology.

In some implementations, the method 400 of FIG. 4 is embodied as instructions stored on a computer-readable storage device. In a particular implementation, a computer-readable storage device stores instructions that, when executed by a processor, cause the processor to perform operations including receiving an ADS-B message indicating an identifier of an aircraft and indicating a position of the aircraft. The operations include accessing a tamper-resistant distributed public ledger of authenticated flight plan data to determine whether flight plan data associated with the identifier is stored in the tamper-resistant distributed public ledger. The operations include, conditioned upon a determination that the flight plan data is stored in the tamper-resistant distributed public ledger, comparing the position to a flight path indicated by the flight plan data. The operations include selecting a characteristic of an icon corresponding to the aircraft based on a determination whether the position corresponds to the flight path. The operations further include initiating display, on a display device and based on the characteristic, of the icon at a location corresponding to the position.

Figure 5:
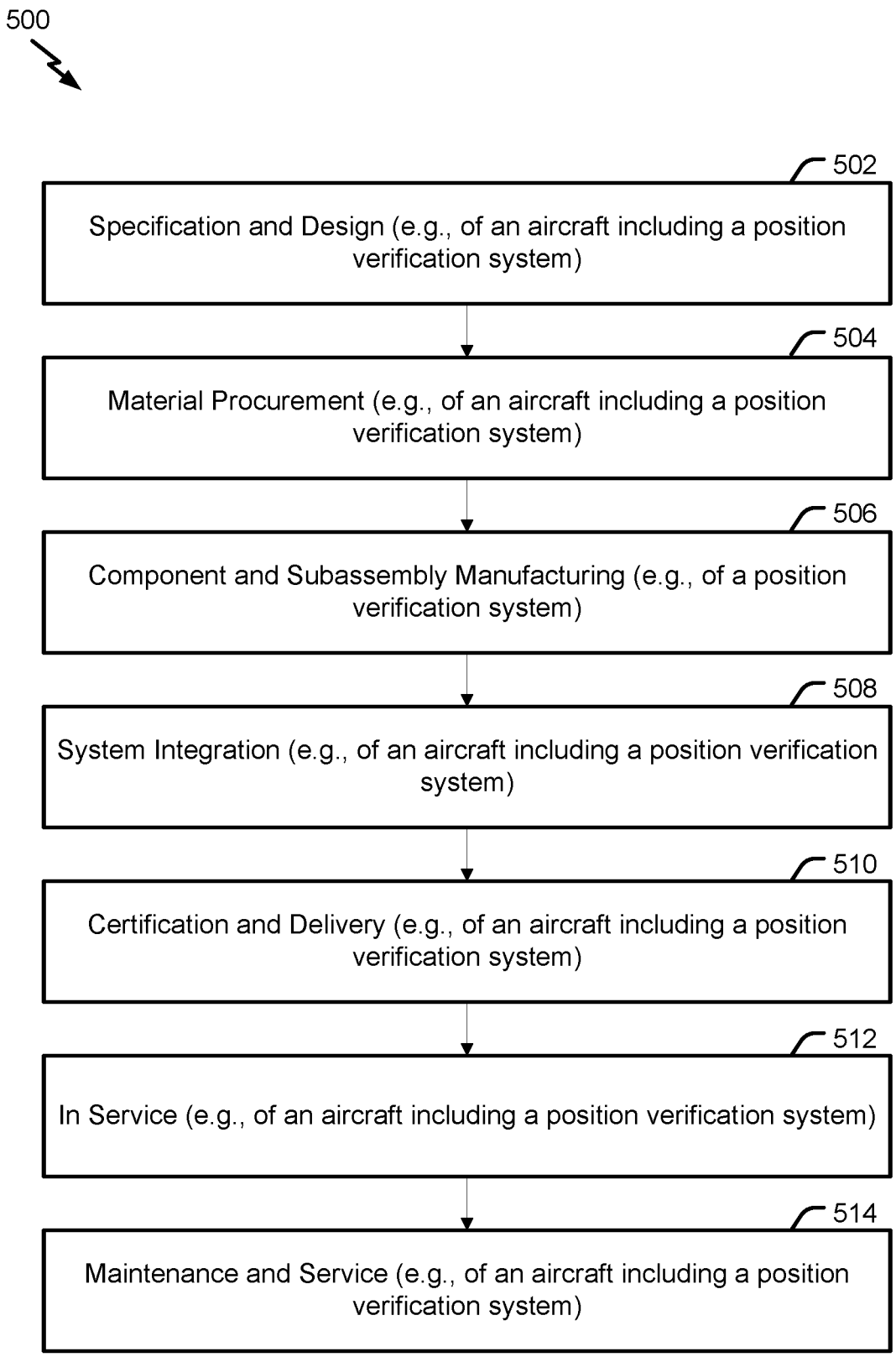
FIG. 5 is a flow chart of a method associated with a position verification system.
Figure 6:
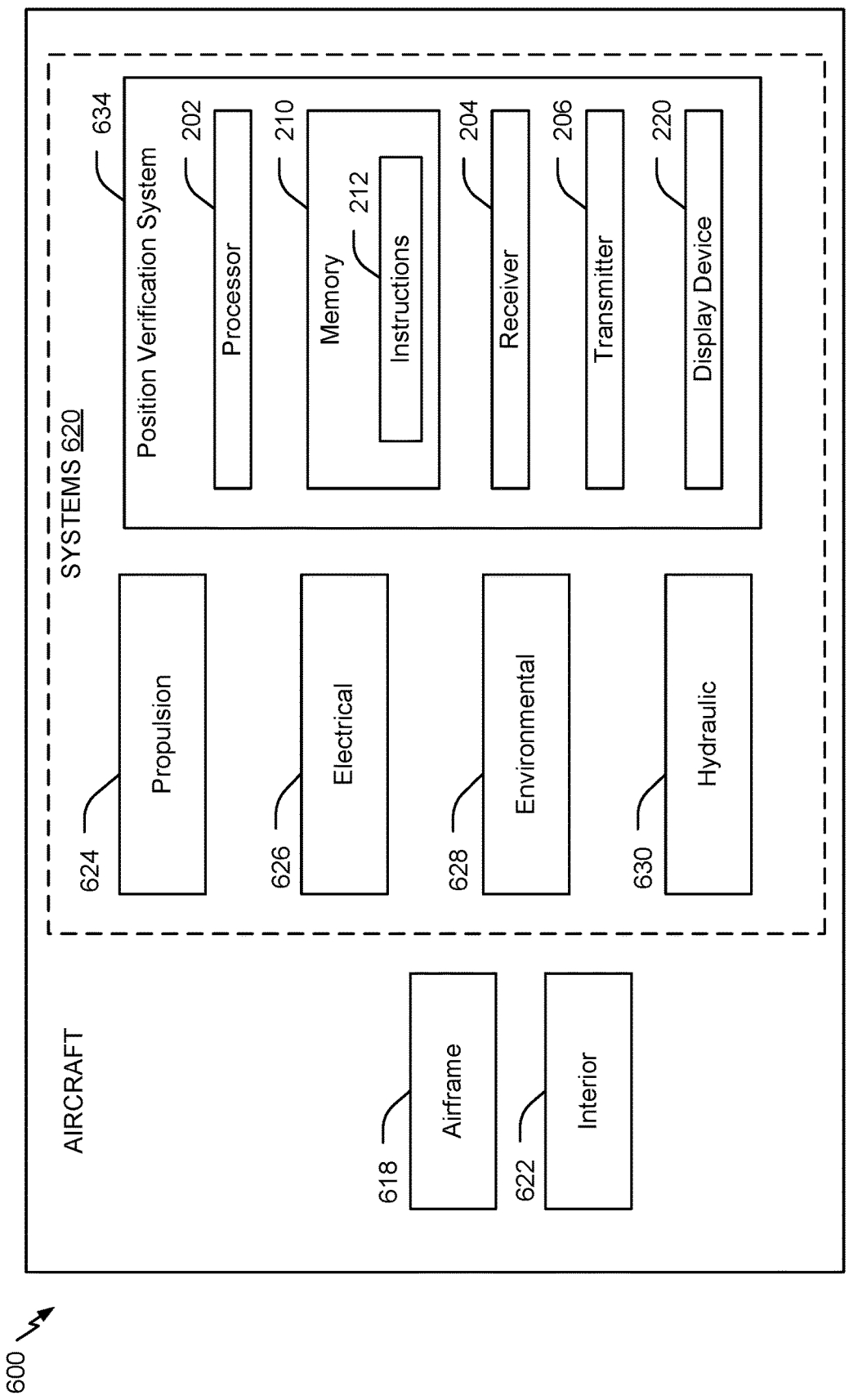
FIG. 6 is a block diagram of an aircraft including a position verification system.

Referring to FIGS. 5 and 6, examples of the disclosure are described in the context of an aircraft manufacturing and service method 500 as illustrated by the flow chart of FIG. 5 and an aircraft 600 as illustrated by the block diagram of FIG. 6.

Referring to FIG. 5, a flowchart of an illustrative example of a method associated with a position verification system is shown and designated 500. During pre-production, the exemplary method 500 includes, at 502, specification and design of an aircraft, such as the aircraft 600 described with reference to FIG. 6. During the specification and design of the aircraft, the method 500 includes specifying a processor, a memory, a receiver, a transmitter, a display device, or a combination thereof. In a particular implementation, the processor, the memory, the receiver, the transmitter, and the display device include or correspond to the processor 202, the memory 210, the receiver 204, the transmitter 206, and the display device 220, respectively, of FIG. 2. At 504, the method 500 includes material procurement. For example, the method 500 may include procuring materials (such as the processor, the memory, the receiver, the transmitter, the display device, or a combination thereof) for the position verification system.

During production, the method 500 includes, at 506, component and subassembly manufacturing and, at 508, system integration of the aircraft. In a particular implementation, the method 500 includes component and subassembly manufacturing (e.g., producing the processor, the memory, the receiver, the transmitter, the display device, or a combination thereof) of the position verification system and system integration (e.g., coupling the receiver to the processor) of the position verification system. At 510, the method 500 includes certification and delivery of the aircraft and, at 512, placing the aircraft in service. In some implementations, certification and delivery includes certifying the position verification system. Placing the aircraft in service can also include placing the position verification system in service. While in service by a customer, the aircraft may be scheduled for routine maintenance and service (which can also include modification, reconfiguration, refurbishment, and so on). At 514, the method 500 includes performing maintenance and service on the aircraft. In a particular implementation, the method 500 includes performing maintenance and service on the position verification system. For example, maintenance and service of the position verification system includes replacing one or more of the processor, the memory, the receiver, the transmitter, the display device, or a combination thereof.

Each of the processes of the method 500 are performed or carried out by a system integrator, a third party, and/or an operator (e.g., a customer). For the purposes of this description, a system integrator includes without limitation any number of aircraft manufacturers and major-system subcontractors; a third party includes without limitation any number of venders, subcontractors, and suppliers; and an operator is an airline, leasing company, military entity, service organization, and so on.

Referring to FIG. 6, a block diagram of an illustrative implementation of an aircraft that includes components of a position verification system is shown and designated 600. In at least one implementation, the aircraft 600 is produced by at least a portion of the method 500 of FIG. 5. As shown in FIG. 6, the aircraft 600 includes an airframe 618 with a plurality of systems 620 and an interior 622. Examples of the plurality of systems 620 include one or more of a propulsion system 624, an electrical system 626, an environmental system 628, and a hydraulic system 630.

The aircraft 600 also includes a position verification system 634. The position verification system 634 includes the processor 202, the receiver 204, the transmitter 206, the memory 210, and the display device 220, as described with reference to FIG. 2. The processor 202 is configured to verify positions of aircraft based on ADS-B messages and accessing a tamper-resistant distributed public ledger, as described with reference to FIGS. 1 and 2.

Any number of other systems may be included in the aircraft 600. Although an aerospace example is shown, the present disclosure can be applied to other industries. For example, the position verification system 634 can be used onboard a manned or unmanned vehicle (such as a satellite, a spacecraft, a watercraft, or a land-based vehicle), or in a building or other structure.

Apparatus and methods included herein can be employed during any one or more of the stages of the method 500 of FIG. 5. For example, components or subassemblies corresponding to production process 508 can be fabricated or manufactured in a manner similar to components or subassemblies produced while the aircraft 600 is in service, at 512 for example and without limitation. Also, one or more apparatus implementations, method implementations, or a combination thereof can be utilized during the production stages (e.g., stages 502-510 of the method 500), for example, by substantially expediting assembly of or reducing the cost of the aircraft 600. Similarly, one or more of apparatus implementations, method implementations, or a combination thereof can be utilized while the aircraft 600 is in service, at for example and without limitation, to maintenance and service, at 514.

Although one or more of FIGS. 1-6 may illustrate systems, apparatuses, and/or methods according to the teachings of the disclosure, the disclosure is not limited to these illustrated systems, apparatuses, and/or methods. One or more functions or components of any of FIGS. 1-6 as illustrated or described herein may be combined with one or more other portions of another of FIGS. 1-6. For example, one or more elements of the method 400 of FIG. 4 may be performed in combination with one or more other elements of the method 400 of FIG. 4 or with other operations described herein. Accordingly, no single implementation described herein should be construed as limiting and implementations of the disclosure may be suitably combined without departing form the teachings of the disclosure. As an example, one or more operations described with reference to FIG. 4 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of verifying aircraft position information based on automatic dependent surveillance broadcast (ADS-B) messages, the method comprising:

receiving, by a processor from a system, a tamper-resistant distributed public ledger of authenticated flight plan data, wherein an entry for a flight of an aircraft in the tamper-resistant distributed public ledger includes an aircraft identifier of the aircraft, a flight path for the flight, and a hash value to enable validation of the entry;

receiving, by the processor, an ADS-B message indicating an identifier of a first aircraft and indicating a position of the first aircraft, wherein the first aircraft is distinct from the system;

accessing, by the processor, the tamper-resistant distributed public ledger to determine whether the identifier of the first aircraft corresponds to the aircraft identifier of a particular entry in the tamper-resistant distributed public ledger;

conditioned upon a determination that the identifier of the first aircraft corresponds to the aircraft identifier of the particular entry and that the particular entry is authentic based on the hash value of the particular entry, comparing, by the processor, the position to the flight path indicated by the particular entry;

selecting, by the processor, a characteristic of an icon corresponding to the first aircraft based on a determination whether the position corresponds to the flight path;

displaying, on a display device and based on the characteristic, the icon at a location corresponding to the position, wherein an aircraft cockpit of a second aircraft comprises the display device, wherein the display device displays a plurality of icons corresponding to a plurality of flights in an airspace around the second aircraft; and responsive to a determination that the position fails to correspond to the flight path or that the authenticated flight plan data is not stored in the tamper-resistant distributed public ledger, transmitting a message to a flight management system to confirm the position of the first aircraft.

2. The method of claim 1, further comprising displaying an updated display on the display device based on a response from the flight management system.

3. The method of claim 2, further comprising, based on the response confirming the position of the first aircraft, modifying the characteristic of the icon in the updated display.

4. The method of claim 2, further comprising, based on the response indicating that the first aircraft does not exist or that the position is incorrect, removing the icon in the updated display.

5. The method of claim 1, wherein the position corresponds to the flight path based on the position being within a threshold distance of an expected position along the flight path.

6. The method of claim 1, wherein each icon of the plurality of icons has a corresponding characteristic selected based on a corresponding determination of whether a corresponding position corresponds to a corresponding flight path.

7. The method of claim 1, wherein the characteristic comprises a color, a border, a shading, a size, a shape, or a combination thereof, of the icon.

8. The method of claim 1, wherein entries in the tamper-resistant distributed public ledger are not encrypted.

9. The method of claim 1, wherein each entry in the tamper-resistant distributed public ledger includes flight plan data for one or more aircraft during a particular time period.

10. The method of claim 9, wherein the entry for the flight of the aircraft further includes a point of arrival, a point of departure, or both.

11. The method of claim 9, wherein the hash value corresponds to the entry, to a previous entry in the tamper-resistant distributed public ledger, or both.

12. The method of claim 1, wherein entries in the tamper-resistant distributed public ledger are generated by the flight management system conditioned upon an authentication of corresponding flight plan data by the flight management system.

13. The method of claim 12, wherein the flight management system maintains the tamper-resistant distributed public ledger in accordance with an entry adding scheme.

14. An apparatus for verifying aircraft position information based on automatic dependent surveillance broadcast (ADS-B) messages, the apparatus comprising:
an interface configured to receive a tamper-resistant distributed public ledger of authenticated flight plan data from a system, wherein an entry for a flight of an aircraft in the tamper-resistant distributed public ledger includes an aircraft identifier of the aircraft, a flight path for the flight, and a hash value to enable validation of the entry;
a receiver configured to receive an ADS-B message indicating an identifier of a first aircraft and indicating a position of the first aircraft, wherein the first aircraft is distinct from the system;
a processor coupled to the receiver and configured to:
access the tamper-resistant distributed public ledger to determine whether the identifier of the first aircraft corresponds to the aircraft identifier of a particular entry in the tamper-resistant distributed public ledger;
conditioned upon a determination that the identifier of the first aircraft corresponds to the aircraft identifier of the particular entry and that the particular entry is authentic based on the hash value of the particular entry, compare the position to a flight path indicated by the particular entry; and
select a characteristic of an icon corresponding to the first aircraft based on a determination whether the position corresponds to the flight path; and
a display device coupled to the processor and configured to display the icon based on the characteristic and at a location corresponding to the position, wherein an aircraft cockpit of a second aircraft comprises the display device, wherein the display device displays a plurality of icons corresponding to a plurality of flights in an airspace around the second aircraft; and
a transmitter configured to, responsive to a determination that the position fails to correspond to the flight path or that the authenticated flight plan data is not stored in the tamper-resistant distributed public ledger, transmit a message to a flight management system to confirm the position of the first aircraft.

15. The apparatus of claim 14 wherein the processor is further configured to update the characteristic of the icon based on a response from the flight management system.

16. The apparatus of claim 15, wherein the response indicates whether the position passed verification by the flight management system.

17. The apparatus of claim 14, wherein the message includes the identifier of the first aircraft and the position of the first aircraft.

18. The apparatus of claim 14, wherein the message is configured to cause the flight management system to transmit a message to the first aircraft.

19. A computer-readable storage device storing instructions that, when executed by a processor, cause the processor to perform operations comprising:
receiving a tamper-resistant distributed public ledger of authenticated flight plan data from a system, wherein an entry for a flight of an aircraft in the tamper-resistant distributed public ledger includes an aircraft identifier of the aircraft, a flight path for the flight, and a hash value to enable validation of the entry;
receiving an automatic dependent surveillance broadcast (ADS-B) message indicating an identifier of a first aircraft and indicating a position of the first aircraft, wherein the first aircraft is distinct from the system;
accessing the tamper-resistant distributed public ledger to determine whether the identifier of the first aircraft corresponds to the aircraft identifier of a particular entry in the tamper-resistant distributed public ledger;
conditioned upon a determination that the identifier of the first aircraft corresponds to the aircraft identifier of the particular entry and that the particular entry is authentic based on the hash value of the particular entry, comparing the position to a flight path indicated by the particular entry;
selecting a characteristic of an icon corresponding to the first aircraft based on a determination whether the position corresponds to the flight path;
initiating display, on a display device and based on the characteristic, of the icon at a location corresponding to the position, wherein an aircraft cockpit of a second aircraft comprises the display device, wherein the display device displays a plurality of icons corresponding to a plurality of flights in an airspace around the second aircraft; and
responsive to a determination that the position fails to correspond to the flight path or that the authenticated flight plan data is not stored in the tamper-resistant distributed public ledger, transmitting a message to a flight management system to confirm the position of the first aircraft.

20. The computer-readable storage device of claim 19, wherein the authenticated flight plan data corresponds to a particular geographic region.

* * * * *